(12) United States Patent
Wu

(10) Patent No.: US 6,698,022 B1
(45) Date of Patent: Feb. 24, 2004

(54) TIMESTAMP-BASED TIMING RECOVERY FOR CABLE MODEM MEDIA ACCESS CONTROLLER

(75) Inventor: Mengjin Wu, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,911

(22) Filed: Dec. 15, 1999

(51) Int. Cl.$^7$ .......................... H04F 7/173; H04B 1/38; H04B 7/212; H04L 5/16; H04L 12/413

(52) U.S. Cl. ................ 725/111; 375/222; 370/443; 370/458

(58) Field of Search ................. 725/111, 105; 375/222; 370/442, 443, 458; H04N 7/173; H04B 1/38, 7/212; H04L 5/16, 12/413

(56) References Cited

U.S. PATENT DOCUMENTS

| 6,230,326 | B1 | * | 5/2001 | Unger et al. ................ 725/111 |
| 6,243,369 | B1 | * | 6/2001 | Grimwood et al. ......... 370/335 |
| 6,385,773 | B1 | * | 5/2002 | Schwartzman ............. 725/124 |
| 6,449,291 | B1 | * | 9/2002 | Burns et al. ................ 370/516 |
| 6,526,070 | B1 | * | 2/2003 | Bernath et al. ............. 370/509 |

OTHER PUBLICATIONS

Østergaard, Rolf V., "What is a Cable Modem?" http://www.godset.dk/cablemodem/01.htm, p. 1, 1998–1999.
Østergaard, Rolf V., "What is a Cable Modem?" http://www.godset.dk/cablemodem/02.htm, pp. 1–2, 1998–1999.
Østergaard, Rolf V., "What is a Cable Modem?" http://www.godset.dk/cablemodem/03.htm, p. 1, 1998–1999.
Østergaard, Rolf V., "What is a Cable Modem?" http://www.godset.dk/cablemodem/04.htm, pp. 1–2, 1998–1999.
Østergaard, Rolf V., "What is a Cable Modem?" http://www.godset.dk/cablemodem/05.htm, pp. 1–2, 1998–1999.
Østergaard, Rolf V., "What is a Cable Modem?" http://www.godset.dk/cablemodem/06.htm, pp. 1–2, 1998–1999.
Østergaard, Rolf V., "What is a Cable Modem?" http://www.godset.dk/cablemodem/07.htm, pp. 1–3, 1998–1999.
Østergaard, Rolf V., "What is a Cable Modem?" http://www.godset.dk/cablemodem/08.htm, pp. 1–2, 1998–1999.
Østergaard, Rolf V., "What is a Cable Modem?" http://www.godset.dk/cablemodem/09.htm, pp. 1–2, 1998–1999.
Østergaard, Rolf V., "What is a Cable Modem?" http://www.godset.dk/cablemodem/10.htm, p. 1, 1998–1999.
Østergaard, Rolf V., "What is a Cable Modem?" http://www.godset.dk/cablemodem/11.htm, p. 1, 1998–1999.
Østergaard, Rolf V., "What is a Cable Modem?" http://www.godset.dk/cablemodem/12.htm, pp. 1–2, 1998–1999.
Østergaard, Rolf V., "What is a Cable Modem?" http://www.godset.dk/cablemodem/13.htm, pp. 1–3, 1998–1999.
Østergaard, Rolf V., "What is a Cable Modem?" http://www.godset.dk/cablemodem/14.htm, pp. 1–2, 1998–1999.

* cited by examiner

*Primary Examiner*—Vivek Srivastava
(74) *Attorney, Agent, or Firm*—Fliesler Meyer LLP

(57) ABSTRACT

A method for employing timestamps received by a media access controller (MAC) of a cable modem from a cable modem termination system (CMTS) to schedule upstream transmissions of the cable modem. A plurality of adjustment values, at least one of which is calculated using a least-square estimation algorithm, are used to adjust a local clock counter of the cable modem MAC. The local clock counter of the MAC is adjusted by one count for every number of cycles equal to a first adjustment value. The local clock counter of the MAC is further adjusted by a number of counts equal to a second adjustment value each time a corrected timestamp is calculated.

27 Claims, 4 Drawing Sheets

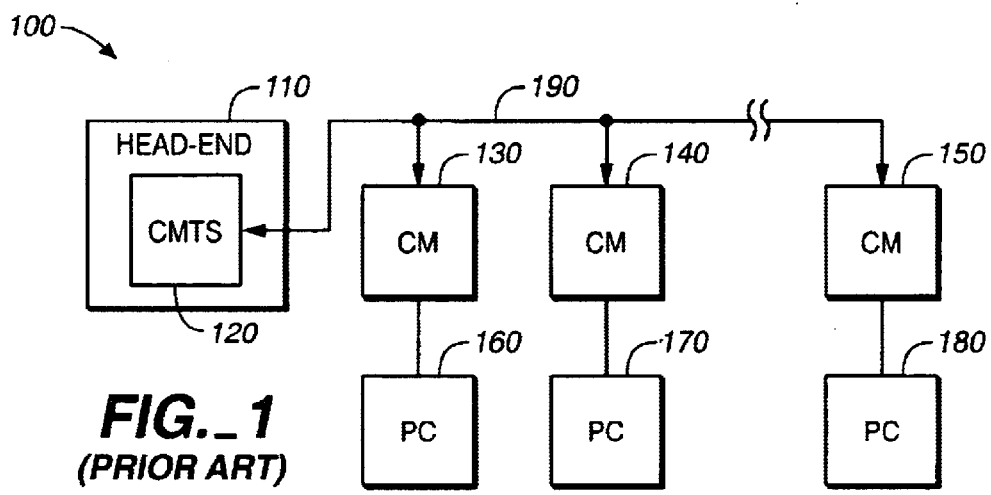
FIG._1
(PRIOR ART)
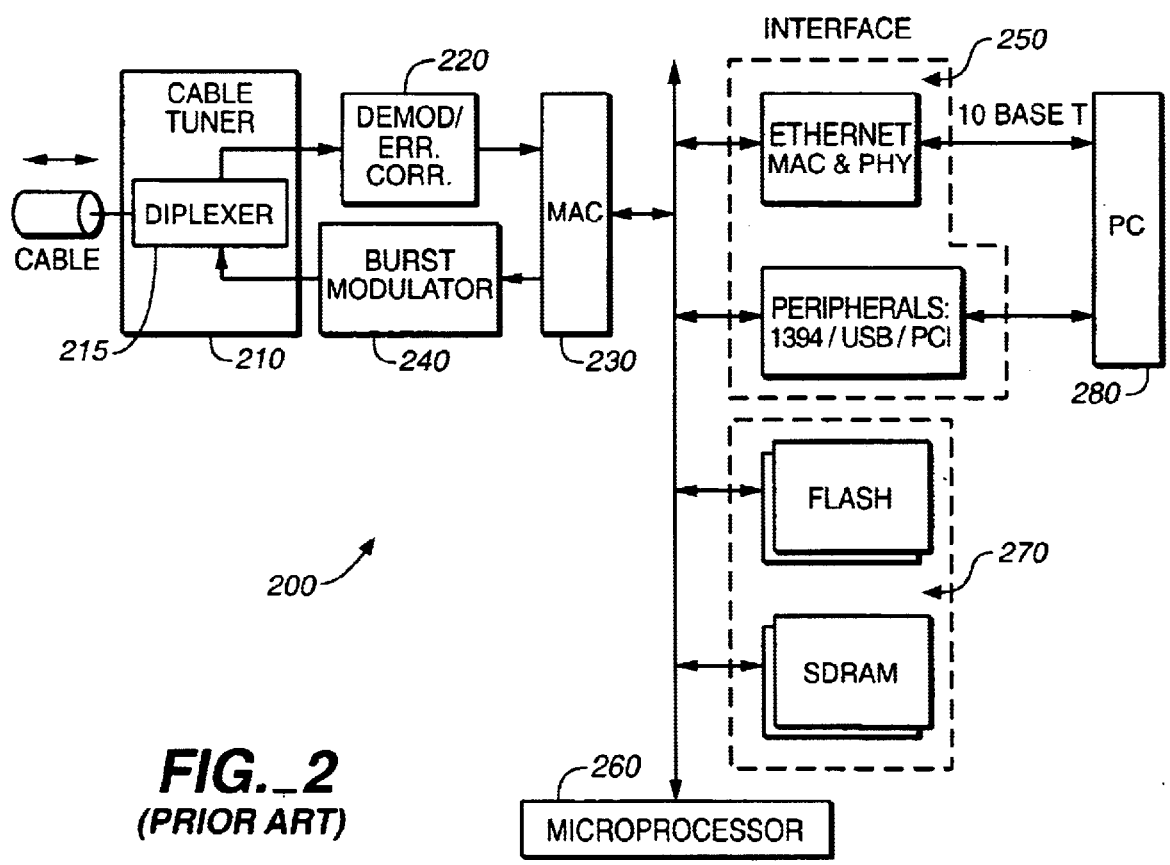
FIG._2
(PRIOR ART)

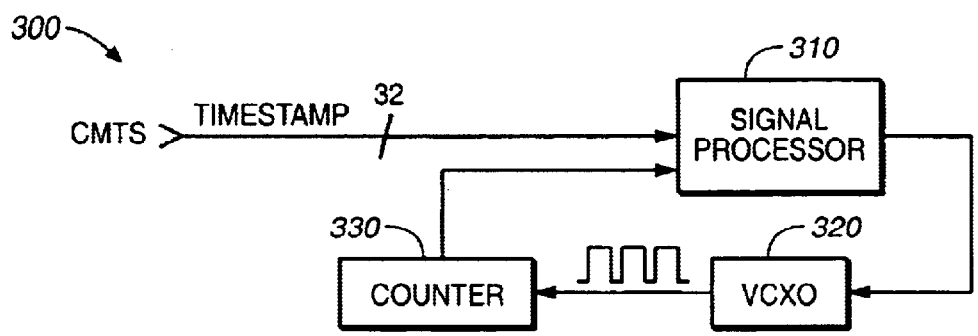
FIG._3
*(PRIOR ART)*
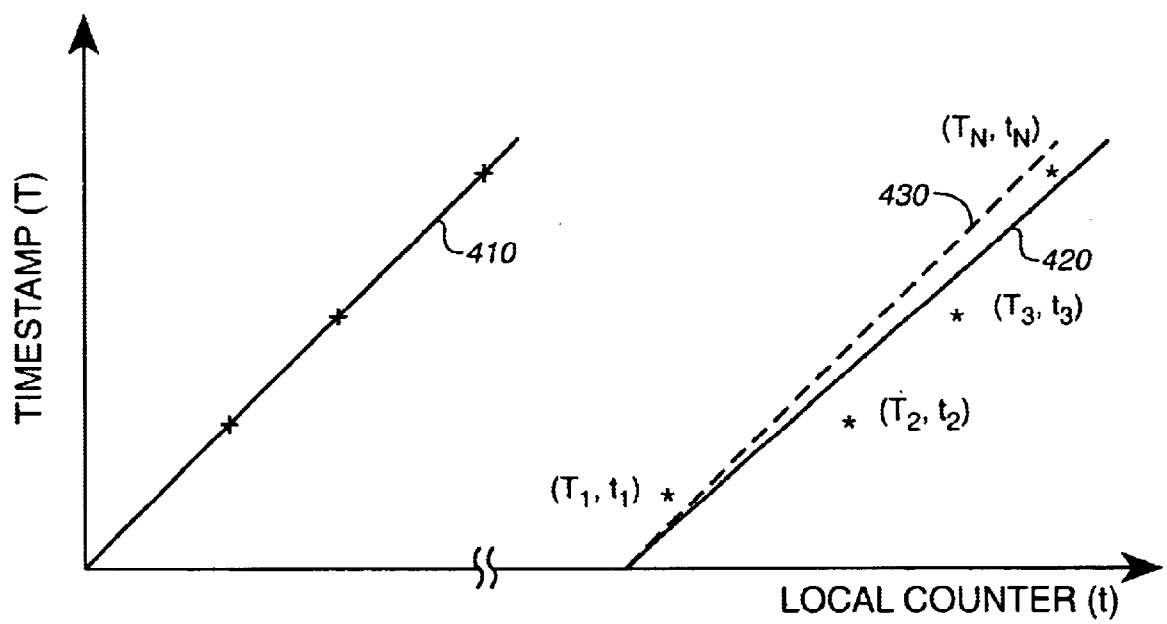
FIG._4

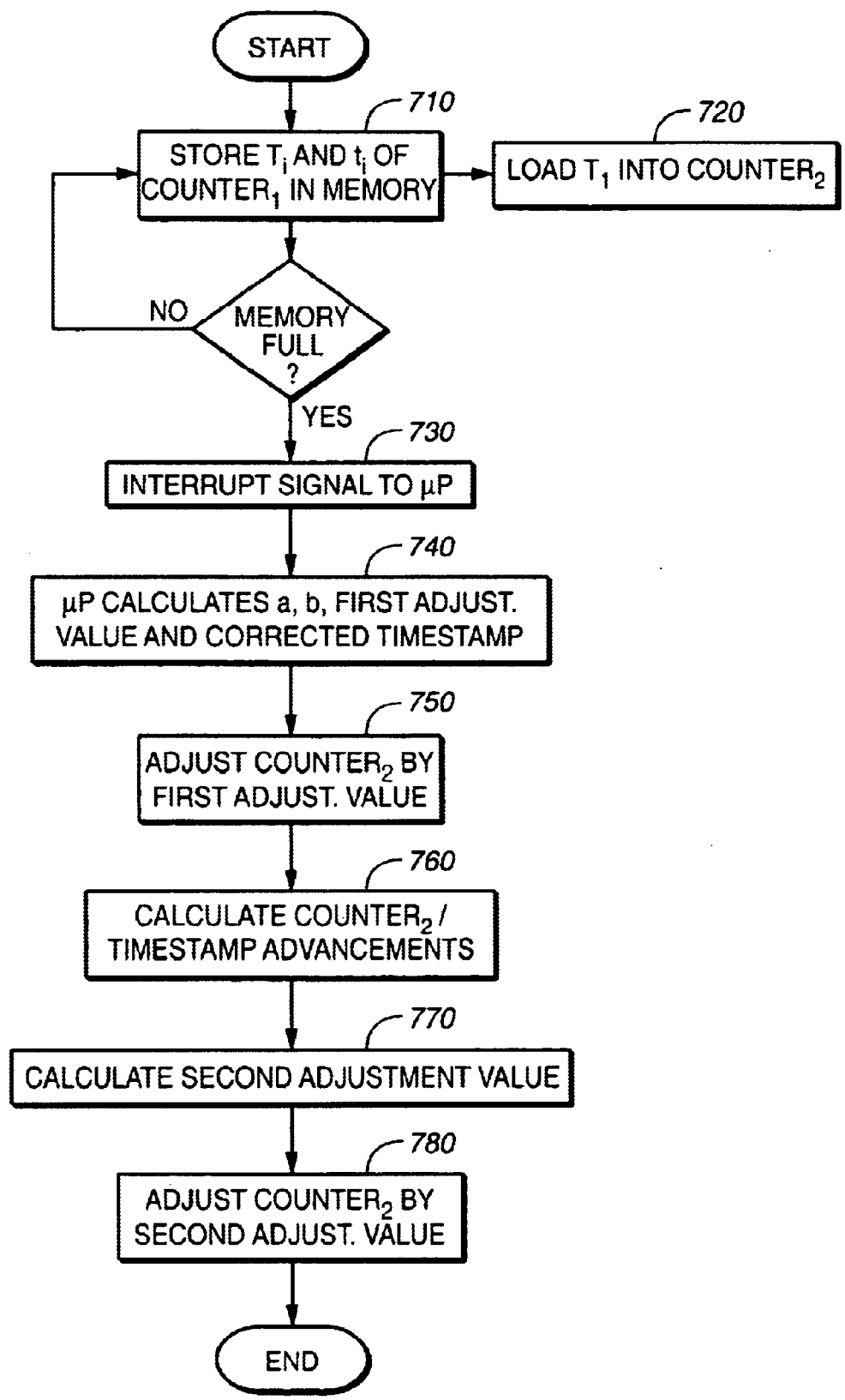
FIG._5

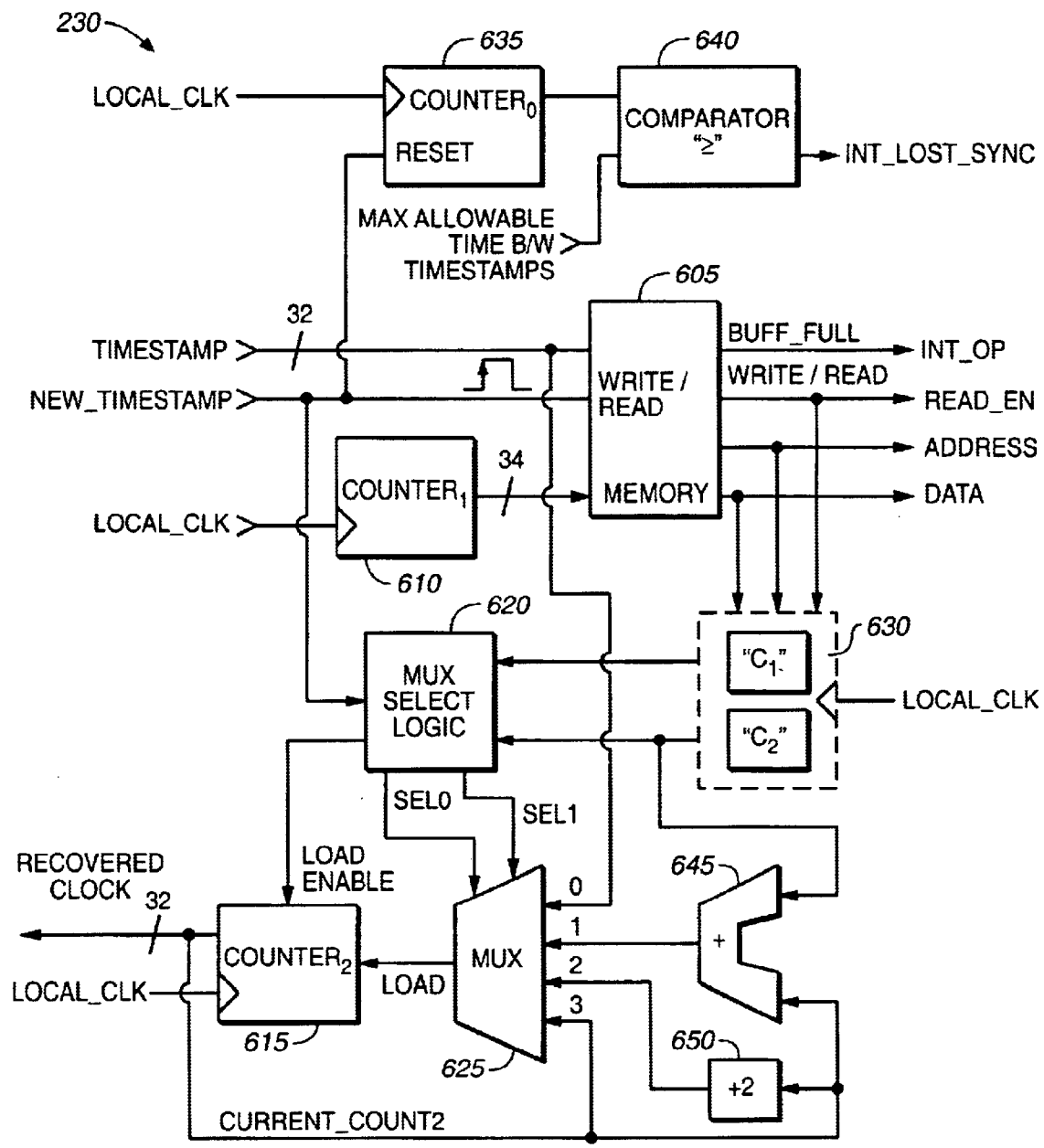
FIG._6

TIMESTAMP-BASED TIMING RECOVERY FOR CABLE MODEM MEDIA ACCESS CONTROLLER

BACKGROUND

1. Field of the Invention

The invention relates to a media access controller (MAC) for a cable modem, and particularly a method for recovering a global timing reference from a plurality of timestamps periodically transmitted from a cable modem termination system (CMTS).

2. Description of Related Art

Traditional modems provide point-to-point communications between data communications equipment (DCE) and data terminal equipment (DTE) over relatively long distances at transmission rates ranging from 28 kbit/sec to about 50 kbit/sec. In contrast, Ethernet or local area network (LAN) connections, with typical transmission rates ranging from tens to hundreds of megabits per second, provide multipoint communications where all data terminals (e.g., terminals, PCs, hosts) attached to the network can communicate with all other data terminals over relatively short distances (typically less than 1 km).

A cable modem offers something in between. A cable modem provides point-to-multipoint communication over ordinary cable TV (CATV) networks. Most CATV networks are hybrid fiber-coax networks, in which the TV signals are initially transmitted over fiber-optical cables from a head-end to a location near the subscriber, whereupon the TV signals are re-transmitted over coaxial cables which run to the subscribers' premises. While CATV networks typically transmit signals only in one direction from the provider to the subscriber, amplifiers in the network can be upgraded to permit bidirectional communication between the provider and the subscriber. Cable modems connected to such networks thus enable subscribers to transmit data to and receive data from the provider.

Cable modems typically have speeds of 3 Mbit/sec to 50 Mbit/sec and can operate over distances of over 100 km. FIG. 1 illustrates a typical cable modem system 100. A head end 110 includes a cable modem termination system (CMTS) 120, which is connected to cable modems (CMs) 130, 140, and 150 over an all-coaxial or hybrid fiber-coax (HFC) network. Cable modems 130, 140, and 150 are in turn connected to customer-premise-equipment, for example, personal computers (PCs), 160, 170, and 180, respectively. While data can flow between CMTS 120 and each of the attached PCs, data cannot flow between individual PCs unless the data has been first relayed to CMTS 120. CMTS 120 can typically drive about 1000 simultaneously connected cable modem subscribers on a single TV channel.

To date, several competing cable modem standards exist. The Multimedia Cable Network Systems—Data Over Cable Service Interface Specification (MCNS-DOCSIS 1.1 Interim Specification, SP-RFIv1.1-I01-990311), hereby incorporated by reference, is the predominant cable modem standard in the United States. In Europe, EuroDOCSIS and DVB/DAVIC (also known as DVB-RCC) are vying for dominance. IEEE is also working on standardizing the next generation physical layer for cable modems capable of upstream bit rates of approximately 30 Mbit/sec.

Several cable modem configurations are available to subscribers. Subscribers can purchase external cable modems, internal cable modems, or interactive set-top boxes. An external cable modem is typically connected to either an Ethernet connection or a universal serial bus (USB) connection. While the Ethernet option permits more than one PC to access the cable modem, it requires that each PC be equipped with an internal Ethernet card. On the other hand, the USB option is easy to install but it can only accommodate one PC per cable modem. Internal cable modems are typically inexpensive peripheral component interconnect (PCI) bus add-on cards that are normally used only in desktop PCs. Finally, interactive set-top boxes are essentially cable modems that provide a return channel, often through a plain old telephone system (POTS), that allows the subscriber to browse the web and send email directly from a TV screen, for example.

Despite these differences, all cable modems essentially share the same architecture. FIG. 2 illustrates the basic cable modem architecture. This architecture defines a cable tuner 210, diplexer 215, demodulator 220, media access controller (MAC) 230, burst modulator 240, interface 250, microprocessor 260, and memory 270. Tuner 210 connects directly to the CATV outlet and typically includes diplexer 215. Diplexer 215 permits signals to be transmitted downstream from the CMTS to the PC and upstream from the PC to the CMTS.

In the downstream direction, CATV signals are transmitted to the cable modem via tuner 210. Tuner 210 converts the CATV signals to a lower frequency (e.g., approximately 6–44 MHZ) and this intermediate frequency (IF) signal feeds demodulator 220. Demodulator 220 performs analog-to-digital (A/D) conversion, demodulation using 64 or 256 quadrature amplitude modulation (QAM-64/256), Reed-Solomon error correction, and moving picture experts group (MPEG) frame synchronization. The output of demodulator 220 feeds MAC 230. MAC 230 can be implemented in hardware or a combination of hardware and software and typically operates in conjunction with an external microprocessor 260 and memory 270. The output of MAC 230 feeds interface 250 such as Ethernet, IEEE 1394, USB, or PCI and is ultimately received by an external PC 280. Data in the downstream direction are received in continuous streams and are received by all active cable modems on the system.

In the upstream direction, data passes through interface 250 and is fed to MAC 230. MAC 230 performs a ranging process to compensate for different cable losses and delays. Specifically, the ranging process provides (1) a time offset by which to offset frame transmission so that frames arrive at the expected mini-slot (time slot) at the CMTS; (2) the relative change in the transmission power level that the CM is to make in order that the transmissions arrive at the CMTS at the desired power level; and (3) the relative change in the transmission frequency that the CM is to make in order to better match the CMTS. Burst modulator 240 performs Reed-Solomon encoding, scrambling, preamble prepending, quadrature phase shift keying/quadrature amplitude modulation (QPSK/QAM-16) and, digital-to-analog (D/A) conversion. The output of burst modulator 240 typically passes through a driver (not pictured) with a variable output level to compensate for any cable losses before being supplied to tuner 210. The data is then passed through diplexer 215 and transmitted to CMTS 120.

As upstream data transmission occurs in bursts, active modems on the system are all able to transmit on the same frequency in accordance with the time division multiple access (TDMA) protocol. This upstream transmission frequency typically ranges from 5–65 MHZ (or 5–42 MHZ) and the bandwidth per channel is typically 2 MHZ for a 3 Mbit/sec (~400 kB/sec) QPSK channel. Each active modem transmits bursts of data in time slots designated as reserved or contention. A reserved slot denotes a time slot allocated to a specific cable modem. A contention slot is accessible by all active cable modems and is typically used for very short data transmissions. If two active cable modems transmit using the same contention slot, a collision occurs and the data is lost.

In accordance with the TDMA protocol, the timing and synchronization between the cable modem and the CMTS is critical for upstream data transmission to the prevent collisions and the ensuing loss of data. DOCSIS 1.1 Interim Specification requires that the cable modem must thus be able to precisely time its transmissions to arrive at the CMTS at the start of the assigned mini-slot within 0.25 $\mu$sec plus ½ symbol (i.e., approximately 0.44 $\mu$sec at the highest symbol rate). The CMTS facilitates this synchronization by periodically sending to the active cable modem a ranging offset and a global timing reference. The ranging offset approximates the round trip cable delay between the active cable modem and the CMTS. The global timing reference is contained within a 32-bit timestamp that is subject to timestamp jitter and an uncertainty in transmission delay between the active cable modem and the CMTS.

FIG. 3 illustrates a simplified prior art system 300 for recovering the global timing reference from the 32-bit timestamps received periodically from the CMTS. The prior art system employs a local 32-bit clock counter 330, a signal processing block 310, and a voltage-controlled oscillator (VCXO) 320. The output of local clock counter 330 and the 32-bit timestamp are supplied to signal processing block 310 which compares the two signals and generates a voltage signal representative of the difference between the timestamp and the output of local clock counter 330. Depending on the magnitude of this voltage signal, VCXO 320 adjusts the clock frequency of local clock counter 330 to synchronize the count of local clock counter 330 with the global timing reference derived from previously received timestamps. Most of the discrepancies between the frequency of the CMTS master clock and the local clock are thus eliminated.

This prior art system continually adjusts the actual frequency of local clock counter to synchronize it with that of the CMTS master clock. Consequently, the CM can derive the global timing reference by adding the ranging offset to the current count. This synchronization of the local clock counter enables the cable modem MAC to accurately schedule upstream transmissions to the CMTS within the allocated time slots. This prior art system accurately synchronizes the clock frequency of the MAC's local clock counter to that of the CMTS master clock, and, with the assistance of the ranging offset, permits the MAC to accurately time its upstream data transmissions.

While accurate, voltage-controlled oscillators are typically very expensive and can significantly increase the cost of the cable modem. Moreover, voltage-controlled oscillators require accompanying analog control circuitry that can significantly increase the complexity of the cable modem. Accordingly, there is a need for a simplified and more cost effective system and method of recovering a global timing reference from a plurality of timestamps periodically transmitted from the CMTS.

SUMMARY OF THE INVENTION

Timestamps,are periodically sent by a cable modem termination system to all active cable modems. According to the invention, roughly described, at least one timestamp received and a corresponding count of a first local clock counter are stored in a memory. A first timestamp of the at least one timestamp received is stored in a second local clock counter. A plurality of adjustment values based on the timestamps and the outputs of the first and second local clock counters are computed using a least square estimation algorithm when an interrupt condition is satisfied. The local count of the second local clock counter is periodically adjusted by the adjustment values to synchronize the second local clock counter to the global timing reference.

BRIEF DESCRIPTION OF THE DRAWINGS

The invention will be described with respect to particular embodiments thereof, and reference will be made to the drawings, in which:

FIG. 1 is a block diagram of a prior art cable modem system;

FIG. 2 is a block diagram of a prior art cable modem;

FIG. 3 is a block diagram of a prior art system for recovering a global timing reference periodically sent by a CMTS;

FIG. 4 is a diagram illustrating a relationship between local clock counter values of a cable modem MAC and timestamps periodically received from the CMTS;

FIG. 5 is a flowchart of an example series of steps for synchronizing a local clock counter of a cable modem MAC with the CMTS global timing reference; and FIG. 6 is a block diagram of a cable modem MAC in an embodiment of the invention.

DETAILED DESCRIPTION

In order to accurately schedule a cable modem's upstream transmission at the prescribed frequency in the designated slot, the MAC's local clock counter must be periodically adjusted to track the CMTS master clock counter. As previously described, the prior art system of FIG. 3 performs this adjustment by employing voltage-controlled oscillator 320 to adjust the clock frequency of the MAC's local clock counter 330. By adjusting the frequency of local clock counter 330, the prior art system of FIG. 3 is able to adjust the count of local clock counter 330 to synchronize it with the CMTS master clock counter (not shown).

The present invention takes a different approach. Instead of adjusting the clock frequency of the MAC's local clock counter to adjust the count of the local clock counter, the present invention directly adjusts the count of the MAC's local clock counter without adjusting the input frequency of the local clock counter's clock signal. This approach achieves the same result as the prior art system without an expensive voltage-controlled oscillator and the accompanying analog control circuitry.

FIG. 4 is a symbolic diagram illustrating the relationship between count values of a local clock counter of a cable modem MAC and the timestamps periodically received from the CMTS. For every 32-bit timestamp $T_1, T_2, T_3, \ldots T_N$ received by the cable modem MAC, there exists a corresponding local clock counter value $t_1, t_2, t_3, \ldots t_N$. Line 410 represents an ideal scenario where there is no timestamp jitter, no cable delay, and no drift in the local clock counter and the CMTS master clock counter.

Given no jitter, no cable delay, and no clock drift, the count of the MAC's local clock counter always tracks that of the CMTS master clock counter. Upon receipt of the timestamps, the MAC's local clock counter is synchronized to the CMTS master clock counter by simply loading each timestamp into the local clock counter. These idealized timestamps received by the MAC are represented in FIG. 4 as "+" symbols, which can all be connected by a line 410 having a slope of one. Accordingly, upstream data transmissions from active cable modems always occur at the prescribed time slots.

However, under more realistic conditions, the timestamps received by the MAC are adversely affected by jitter, clock drift, and cable delays. These factors introduce errors into the timestamps that can make the task of accurately synchronizing the MAC's local clock counter to the CMTS master clock counter very difficult.

The asterisks "*" in FIG. 4 represent these timestamps as they are received by the MAC at local clock counter values $t_1, t_2, t_3, \ldots t_N$, respectively. Line 430 merely represents line 410 shifted by a constant transmission delay. The asterisks' deviations from line 430 represent the errors introduced by jitter, clock drift, and variations in cable transmission delay. Inaccurate timestamp information can cause the MAC to schedule upstream data transmissions at incorrect time slots and thus cause data to be lost as upstream transmissions from different cable modems collide with one another.

Assuming that the CMTS master clock counter and the MAC's local clock counter have low drift rates (e.g., the local clock counter has a drift rate of less than 0.1 msec/600 msec=$1.5 \times 10^{-7}$/sec) and assuming that the frequency of the CMTS timestamp jitter noise is much higher than the frequency at which timestamps are transmitted to the MAC (nominally 10's msec for DOCSIS cable modems), the relationship between the timestamps and the local clock counter values is highly linear over short periods of time. This linear relationship is approximated by line 420 in FIG. 4 and can be modeled by:

$$T = at + b \quad (1)$$

Equation (1) can be alternatively expressed as:

$$T = [t \ 1]\begin{bmatrix} a \\ b \end{bmatrix} + n \quad (2)$$

where,

T=CMTS master clock count
t=local clock count
a,b=parameters to model this linear relationship
n=noise By estimating a and b, a jitter free timestamp, $T_c$, can be estimated for every local clock counter value t. Estimates for a and b are best obtained using a least-square estimation algorithm since the interval between synchronization timestamps is randomly variable and the transmission delays through the physical layer are relatively constant. Thus, if N timestamps are received, equations (3) and (4) and can be used to compute a and b, respectively:

$$a = \frac{N \sum_{i=1}^{N} t_i T_i - \sum_{i=1}^{N} t_i \sum_{i=1}^{N} T_i}{N \sum_{i=1}^{N} t_i^2 - \left(\sum_{i=1}^{N} t_i\right)^2} \quad (3)$$

$$b = \frac{\sum_{i=1}^{N} t_i^2 \sum_{i=1}^{N} T_i - \sum_{i=1}^{N} t_i \sum_{i=1}^{N} T_i t_i}{N \sum_{i=1}^{N} t_i^2 - \left(\sum_{i=1}^{N} t_i\right)^2} \quad (4)$$

However, the computations of a and b using equations (3) and (4) place a considerable burden on a microprocessor. To reduce this computation burden on the microprocessor, the derivation form of the least-square estimation algorithm is employed. Accordingly, Equation (1) is rewritten in discrete time format as:

$$z(k) = h^T(k)\theta + n(k) \quad (5)$$

where, $$\theta = \begin{bmatrix} a \\ b \end{bmatrix} \quad (6)$$

n(k)=the $k^{th}$ sample of jitter noise n;
z(k)=the $k^{th}$ sample of T;
$h^T(k)=[t(k) 1]$, where t(k) is the $k^{th}$ sample of t.

The derivation form of the least-square estimation algorithm can be expressed as:

$$\theta(k) = \theta(k-1) + K(k)[z(k) - h^T(k)(\theta(k-1)] \quad (7)$$

where, $$K(k) = P(k-1)h(k)\left[h^T(k)P(k-1)h(k) + \frac{1}{\Lambda(k)}\right]^{-1} \quad (8)$$

$$P(k) = [I - K(k)h^T(k)]P(k-1) \quad (9)$$

While it is possible that the above least-square estimation algorithm can be performed by specially designed hardware, an embodiment of the method according to the present invention performs the required mathematical operations by software through an interrupt routine. This interrupt routine will be further described below.

FIG. 5 is a symbolic flowchart of an example of a series of steps for recovering a global timing reference in accordance with the present invention. In step 710, each 32-bit timestamp, $T_i$, received by the MAC and a corresponding count of a first local clock counter, $t_i$, are stored in a memory. The first timestamp received by the MAC, $T_1$, is correspondingly loaded into a second local clock counter in step 720. Step 710 is repeated until an interrupt request is signaled.

In an embodiment of the present invention, the interrupt request is generated every second. The corresponding timestamp recovery error is within 0.2 $\mu$sec. This is well within DOCSIS's requirement that the cable modem must be able to time its transmissions to arrive at the CMTS at the start of the assigned mini-slot within 0.25 $\mu$sec plus ½ symbol (i.e., approximately 0.44 $\mu$sec at the highest symbol rate) In another embodiment, the interrupt request is generated each time a timestamp is received. In another embodiment, the interrupt request is generated every 500 msec. In the preferred embodiment, the interrupt request is generated when the memory in which the timestamps and corresponding counts of the first local clock counter are stored is full.

In terms of microprocessor load, the derivation form of the least-square estimation algorithm requires less than 10,000 instructions. If the interrupt frequency is once per second, the processing power used is about 0.01 MIPS (million instructions per second). If, for example, a 100 MIPS microprocessor is used, the load introduced by the interrupt routine is negligible. The higher the interrupt frequency, the higher the recovery accuracy that can be achieved. However, the higher the interrupt frequency, the higher the computation burden on the microprocessor. Thus, a trade-off exists between memory size, interrupt frequency, microprocessor load, and recovery accuracy. According to the present invention, the size of the memory is chosen in view of the worst case interrupt frequency that causes a tolerable computation burden on the microprocessor. In step 730, the MAC sends the interrupt request signal to an external microprocessor. The microprocessor will then read the contents of the memory (i.e., the 32-bit timestamps and the corresponding counts of the first local clock counter). In step 740, the microprocessor operates on the contents of the memory and generates estimates for a and b according to equations (7) to (9) above. The microprocessor in step 740 also calculates a first adjustment value, $C_1$, and a corrected timestamp, $T_c$, by substituting the estimates of a and b into Equations (10) and (11):

$$C_1 = \frac{1}{a-1} \quad (10)$$

$C_1$ is then written to a register.

In step 750, the second local clock counter is adjusted by the first adjustment value, $C_1$. The second local clock counter is decremented by one count every $C_1$ cycles if $C_1$ is a negative number. Alternatively, if $C_1$ is a positive number, the second local clock counter is incremented by one count every $C_1$ cycles. In one embodiment of the invention, steps 740 and 750 can be performed concurrently. That is, if an updated first adjustment value $C_1$ is not available, the previously calculated first adjustment value can be used instead.

In step 760, using the corrected timestamps calculated from Equation (11), the cable modem's MAC uses equation (12) to calculate a corrected timestamp advancement value:

$$\Delta T_{ci} = T_{ci} - T_{ci-1} \quad (12)$$

The corrected timestamp advancement value is essentially the difference in the corrected timestamps from successive interrupt requests. The cable modem's MAC also calculates a second local clock counter advancement value.

The second local clock counter advancement value is the difference in successive counts of the second local clock counter corresponding to the successive corrected timestamps. The cable modem's MAC uses equation (13) to calculate the second local clock counter advancement value:

$$\Delta t_{2i} = t_{2i} - t_{2i-1} \quad (13)$$

In step 770, the MAC calculates a second adjustment value, $C_2$, using Equation (14):

$$C_2 = \Delta T_{ci} - \Delta t_{2i} \quad (14)$$

The purpose of $C_2$ is to eliminate any computational errors that may have accumulated (from the $C_1$ adjustment described above) in the local count of the second local clock counter between ranging intervals. In step 780, the MAC adjusts the second local clock counter by the second adjustment value, $C_2$. If $C_2$ is a negative number, the second local clock counter is decremented by $C_2$ counts each time a corrected timestamp $T_c$ is generated by step 740. Alternatively, if $C_2$ is a positive number, the second local clock counter is incremented by $C_2$ counts each time a corrected timestamp $T_c$ is generated by step 740.

In the preferred embodiment of the present invention, the cable modem's MAC continually adjusts the second local clock counter by both the first and second adjustment values $C_1$ and $C_2$, respectively. Together, with the assistance of the ranging offset, these adjustments accurately synchronize the second local clock counter to the CMTS master clock counter. This synchronization enables the MAC to consistently and accurately schedule upstream transmissions to the CMTS at the prescribed time slots.

FIG. 6 is a block diagram of a cable modem MAC 230 in accordance with the present invention. The rising edge of the first NEW_TIMESTAMP signal indicates the arrival of a timestamp from the CMTS. As distinguished from the 32-bit timestamps, first and second local clock counters 610 and 615 are 34-bit counters. The increased granularity, or higher bit resolution, provided by the 34-bit counters increases the accuracy of the present invention. Thus, if first and second local clock counters 610 and 615 are clocked by the cable modem's 40.96 MHZ crystal oscillator, for example, the error from any subsequent adjustments of second local clock counter 615 is only about 0.025 nsec or 0.25 counts. In contrast, the error using 32-bit local clock counters would be about 1 count.

The rising edge of the first NEW_TIMESTAMP input signal activates multiplexer select logic 620 and causes it to generate a logical 0 at outputs SEL0 and SEL1. In other words, the rising edge of the first NEW_TIMESTAMP input signal produces a logical 00 at the inputs of multiplexer 625. Other conditions (discussed below) cause multiplexer select logic 620 to generate other logical combinations of SEL0 and SEL1 (i.e., 01, 10, or 11). Depending on the logical combinations of SEL0 and SEL1, one of four multiplexer 625 input lines is selected as an input to the second local clock counter 615.

Once the rising edge of the NEW_TIMESTAMP input signal resets first counter 635, first counter 635 begins to count and its output is compared with a fixed value representing the maximum allowable time period between synchronization timestamps. For DOCSIS cable modems, for example, this maximum allowable time period between synchronization timestamps is 600 msec. Thus, if the output of first counter 635 were to exceed 600 msec, the MAC generates an INT_LOST_SYNC signal to signify that the synchronization timestamp was lost. Different implementations of the present invention for other cable modem standards would simply compare the output of first counter 635 with the appropriate maximum allowable time between synchronization timestamps.

When the logical combination SEL0 and SEL1 is 00, multiplexer 625 selects input line 0 as the input to second local clock counter 615. Selection of input line 0 causes the first 32-bit timestamp received by the MAC to be loaded into second local clock counter 615. The first 32-bit timestamp and a corresponding count from first local clock counter 610 is stored in memory 605. Subsequent timestamps received by the MAC and their corresponding counts from first local clock counter 610 are also stored in memory 605 until memory 605 becomes full. While memory 605, as disclosed herein, is a 16×66 SRAM memory, as stated earlier, the size of memory 605 can be chosen during the cable modem implementation phase according to the trade-off between memory size, interrupt frequency, microprocessor load, and recovery accuracy. Once memory 605 is full, its contents are passed to a microprocessor (not shown) via an interrupt request signal. The microprocessor operates on the contents of memory 605 and calculates first and second adjustment values, $C_1$ and $C_2$, respectively, using the above described least-square estimation algorithm. The microprocessor subsequently writes $C_1$ and $C_2$ to register 630. The contents of register 630 are then made available to multiplexer select logic 620.

Depending on the values of $C_1$ and $C_2$, multiplexer select logic 620 generates different logical combinations of SEL0 and SEL1. If $C_1$ is a positive number, multiplexer select logic 620 generates a logical combination of 10 for SEL0 and SEL1. If $C_1$ is a negative number, multiplexer select logic 620 generates a logical combination of 11 for SEL0 and SEL1. Finally, multiplexer select logic 620 generates a logical combination of 01 for SEL0 and SEL1 if and when $C_2$ is written to register 630.

A logical combination of 10 on the SEL0 and SEL1 inputs of multiplexer 625 selects input line 2 as the input to second local clock counter 615. Selection of input line 2 effectively causes the MAC to increase the output, or the count, of second local clock counter 615 by two counts every $C_1$ cycles. This is because the count of second local clock counter 615 is continually being incremented by one count with every rising edge of LOCAL_CLK. Thus, the only way to effectively increase second local clock counter 615 by "one" count is to increase it by two counts. Accordingly, selection of input line 2 on multiplexer 625 causes the CURRENT_COUNT2 (the current count of the second local clock counter 615) to be fed through "plus two" adder 650 before being inputted to second local clock counter 615. The count of second local clock counter 615 is thus incremented by "one" count when $C_1$ is a positive number.

In contrast, a logical combination of 11 on the inputs of multiplexer 625 selects input line 3 as the input to second local clock counter 615. Selection of input line 3 causes the MAC to decrease the output, or the count, of second local clock counter 615 by one count every $C_1$ cycles. However, when the first adjustment value, $C_1$, is a negative number, the MAC effectively decreases second local clock counter 615 by one count every $C_1$ cycles by holding second local clock counter 615 for one count (i.e., preventing second local clock counter 615 from being incremented). Thus, selection of input line 3 causes the CURRENT_COUNT2 to be fed through multiplexer 625 before being again inputted to second local clock counter 615. The count of second local clock counter 615 is prevented from being incremented and second local clock counter 615 is thus decremented by "one" count when $C_1$ is a negative number.

A logical combination of 01 on the inputs of multiplexer 625 selects input line 1 as the input to second local clock counter 615. Selection of input line 1 causes the MAC to adjust second local clock counter 615 by the second adjustment value, $C_2$, each time the MAC generates an interrupt request signal. In other words, the MAC adjusts second local clock counter 615 by $C_2$ each time a corrected timestamp, $T_c$, is calculated. Accordingly, CURRENT_COUNT2 and $C_2$ are added together in adder 645 and second local clock counter 615 is increased by $C_2$ counts if $C_2$ is a positive number and decreased by $C_2$ counts if $C_2$ is a negative number. Note that $C_2$ is in two's complement format.

Finally, in case where, for example, the adjustment for input line 1 occurs at the same time as the adjustments for input lines 2 and 3, multiplexer select logic 620 serializes the adjustments so that all adjustments can be made. Any errors introduced by this serialization is negligible.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, while timing requirements may vary between MCNS-DOCSIS, the present invention may be incorporated into the MACs of in all these cable modems.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for employing timestamps received by a media access controller of a cable modem from a cable modem termination system to schedule upstream transmissions of the cable modem, the method comprising the steps of:

storing at least one timestamp and a corresponding count of a first local clock counter in a memory;

loading a first timestamp of said at least one timestamp in a second local clock counter;

computing a first and second adjustment values based on the at least one timestamp stored in the memory and outputs of the first and second local clock counters; and adjusting the second local clock counter by the first and second adjustment values.

2. The method of claim 1 wherein the computing step is performed by a microprocessor upon receipt of an interrupt request signal.

3. The method of claim 2 wherein the microprocessor computes the first and second adjustment values based on timestamps and the corresponding counts of the first local clock counter previously stored in the memory and the counts of the second local clock counter.

4. The method of claim 2 wherein the interrupt request signal is generated when the memory is full.

5. The method of claim 2 wherein the first adjustment value is computed using a least-square estimation algorithm.

6. The method of claim 2 wherein the step of computing the second adjustment value comprises:

computing a corrected timestamp advancement value;

computing a second local clock counter advancement value; and computing a difference between the corrected timestamp advancement value and the second local clock counter advancement value.

7. The method of claim 6 wherein the corrected timestamp advancement value is a difference between a new corrected timestamp and a previous corrected timestamp, the new and previous corrected timestamps resulting from consecutive interrupt request signals.

8. The method of claim 6 wherein the second local clock counter advancement value is a difference between counts of the second local clock counter corresponding to consecutive interrupt request signals.

9. The method of claim 1 wherein the step of adjusting the second local clock counter comprises the step of adjusting the second local clock counter every number of cycles substantially equal to the first adjustment value.

10. The method of claim 9 wherein the step of adjusting the second local clock counter further comprises the step adjusting the second local clock counter each time a register containing the second adjustment value is reloaded.

11. The method of claim 9 wherein the second local clock counter is decremented by one count if the first adjustment value is a negative number.

12. The method of claim 9 wherein the second local clock counter is incremented by one count if the first adjustment value is a positive number.

13. The method of claim 1 wherein the second local clock counter is decremented by a number of counts substantially equal to the second adjustment value if the second adjustment value is a negative number.

14. The method of claim 1 wherein the second local clock counter is incremented by a number of counts substantially equal to the second adjustment value if the second adjustment value is a positive number.

15. The method of claim 1 wherein the first and second local clock counters have a higher bit resolution than the timestamps received by the media access controller.

16. The method of claim 15 wherein the first and second local clock counters are 34-bit counters.

17. A method for scheduling upstream transmissions of a cable modem by synchronizing the cable modem's media access controller to timestamps periodically received from a cable modem termination system, the method comprising the steps of:

storing at least one timestamp and a corresponding count of a first local clock counter in a memory;

loading a first timestamp of said at least one timestamp in a second local clock counter;

repeating the storing step until an interrupt request signal is generated;

passing contents of the memory to a microprocessor;

computing a first adjustment value;

computing a corrected timestamp;

adjusting the second local clock counter by the first adjustment value;

computing a corrected timestamp advancement value;

computing a second local clock counter advancement value;

computing a second adjustment value; and adjusting the second local clock counter by the second adjustment value.

18. The method of claim 17 wherein the interrupt request signal is generated when the memory is full.

19. The method of claim 17 wherein the corrected timestamp advancement value is a difference between a new corrected timestamp and a previous corrected timestamp, the new and previous corrected timestamps resulting from consecutive interrupt request signals.

20. The method of claim 17 wherein the second local clock counter advancement value is a difference between counts of the second local clock counter corresponding to consecutive interrupt request signals.

21. The method of claim 17 wherein the first adjustment value is computed using a least-square estimation algorithm.

22. The method of claim 21 wherein the second adjustment value is a difference between the corrected timestamp advancement value and the second local clock counter advancement value.

23. The method offal 22 wherein the second local clock counter is decremented by one count for every number of cycles substantially equal to the first adjustment value if the first adjustment value is a negative number.

24. The method of claim 23 wherein the second local clock counter is decremented by a number of counts substantially equal to the second adjustment value if the second adjustment value is a negative number.

25. The method of claim 21 wherein the second local clock counter is incremented by one count for every number of cycles substantially equal to the first adjustment value if the first adjustment value is a positive number.

26. The method of claim 25 wherein the second local clock counter is incremented by a number of counts substantially equal to the second adjustment value if the second adjustment value is a positive number.

27. The method of claim 17 wherein the microprocessor computes the first and second adjustment values based on timestamps and the corresponding counts of the first local clock counter previously stored in the memory and the counts of the second local clock counter.

* * * * *